United States Patent [19]
Cunningham et al.

[11] Patent Number: 5,807,506
[45] Date of Patent: Sep. 15, 1998

[54] CONDUCTIVE POLYMERS

[75] Inventors: Michael F. Cunningham, Kingston; George Liebermann, Mississauga; Hadi K. Mahabadi, Etobicoke; Daniel M. McNeil, Georgetown; Michael S. Hawkins, Cambridge; Thomas E. Enright, Mississauga, all of Canada; Aron J. Cogswell, Rochester, N.Y.

[73] Assignee: Xerox Corporation, Stamford, Conn.

[21] Appl. No.: 829,419

[22] Filed: Apr. 1, 1997

[51] Int. Cl.⁶ ............................... H01B 1/22; H01B 1/24
[52] U.S. Cl. ................ 252/511; 252/512; 252/518.1; 252/520.1; 252/520.2
[58] Field of Search .................... 252/511, 512, 252/513, 514, 518.1, 519.33, 520.1, 520.2; 524/495, 496

[56] References Cited

U.S. PATENT DOCUMENTS

| | | | |
|---|---|---|---|
| 3,243,419 | 3/1966 | Ingram | 260/93.5 |
| 3,505,434 | 4/1970 | Battaerd | 264/15 |
| 3,954,898 | 5/1976 | Hirota et al. | 260/837 R |
| 4,071,670 | 1/1978 | Vanzo et al. | 526/88 |
| 4,562,136 | 12/1985 | Inoue et al. | 430/107 |
| 4,590,141 | 5/1986 | Aoki et al. | 430/108 |
| 4,833,060 | 5/1989 | Nair et al. | 430/137 |
| 4,835,084 | 5/1989 | Nair et al. | 430/137 |
| 4,912,005 | 3/1990 | Goodman et al. | 430/108 |
| 4,948,739 | 8/1990 | Charmot | 436/533 |
| 4,980,665 | 12/1990 | Schotz | 340/310 R |
| 5,043,404 | 8/1991 | Mahabadi et al. | 526/194 |
| 5,236,629 | 8/1993 | Mahabadi et al. | 252/511 |

*Primary Examiner*—Paul Lieberman
*Assistant Examiner*—Mark Kopec
*Attorney, Agent, or Firm*—E. D. Palazzo

[57] ABSTRACT

A process for the preparation of conductive polymers which comprises (a) mixing at least one monomer with at least one conductive component, solvent, at least one polymerization initiator, and an optional chain transfer component; (b) effecting solution polymerization by heating; (c) removing said solvent by azeotropic distillation in an aqueous phase to generate a mixture of polymer and conductive component; (d) drying and grinding the resulting mixture; thereafter dissolving the product resulting in at least one monomer, at least one initiator, and at least one crosslinking component, and an optional chain transfer agent to form an organic phase; (e) mixing said organic phase with a second aqueous phase comprised of water, stabilizer, and an alkali halide; (f) polymerizing the resulting suspension by heating; and (g) subsequently optionally washing and drying the polymeric product, and which product is comprised of polymer and conductive component dispersed therein.

28 Claims, No Drawings

CONDUCTIVE POLYMERS

BACKGROUND OF THE INVENTION

This invention is generally directed to conductive composite particles and processes for the preparation thereof, and more specifically, the present invention relates to processes for the preparation of conductive polymeric composite particles, comprised of polymer and conductive component, or filler distributed, preferably evenly throughout the polymer matrix of the composite, and which component is preferably carbon black. In embodiments, the process of the present invention comprises the preparation of conductive polymeric particles containing a conductive filler distributed substantially throughout the polymer matrix of the particles, and which particles can be selected as carrier powder coatings, and a process which comprises the preparation of conductive polymeric composite particles with a volume average particle size diameter of from between about 0.05 micron to about 5 microns, and preferably from about 1 to about 5 microns, and which size can be determined by, for example, a Coulter Counter. The conductivity of the generated polymeric composite particles can be modified by, for example, varying the weight percent of conductive filler component present in effective amounts of, for example, from between about 1 weight percent to about 50 weight percent, and also by varying the composition of the conductive filler component. Thus, in embodiments conductive submicron polymeric composite particles with a conductivity of from between about $10^{-10}$ (ohm-cm)$^{-1}$ to about 0.10 (ohm-cm)$^{-1}$ can be prepared. In embodiments, particles with average diameter of about 0.05 to about 5 microns are conductive composite particles which are comprised of polymer and a conductive filler distributed evenly throughout the polymer matrix of the composite product, and which product can be obtained by a modified polymerization method in which at least one monomer is mixed with a conductive filler, solvent, one or more polymerization initiators, and an optional chain transfer component; effecting solution polymerization by heating until from about 80 to about 100 weight percent of the monomer has been polymerized; removing and recovering the solvent using an azeotropic distillation process in an aqueous phase, then filtering off the aqueous phase, and subsequently drying and grinding the resulting polymer and conductive filler bead product; dispersing the aforementioned mixture of conductive filler or fillers and polymer in at least one monomer with one or more polymerization initiators, a crosslinking agent and an optional chain transfer agent; dispersing the resulting mixture in water containing a stabilizing component, such as polyvinyl alcohol, to obtain a suspension of particles with an average diameter of from about 0.05 to about 5 microns in water; polymerizing the resulting suspension by heating; and washing the product and then drying; and wherein there is selected an azeotropic distillation, and wherein an alkali iodide, such as potassium iodide is added to the aqueous phase prior to particle formation, and wherein there is preferably selected a continuous inline homogenizer.

Metals such as carrier cores are conductive or semiconductive materials, and the polymeric materials used to coat the surface of metals are usually insulating. Therefore, carrier particles coated completely with polymer or a mixture of polymers can lose their conductivity and become insulating. Although this is desired in some situations, for conductive magnetic brush systems (CMB) the carrier particles should primarily be conductive. Since the carrier polymer coating can be utilized to primarily control carrier tribo, an economical conductive carrier coating process is needed to generate carriers with the desired conductivity and triboelectric properties. Also, conductive polymers are costly, and are not considered suitable for preparing low cost, for example less than $5/pound, coatings, thus a conductive polymer process is needed wherein a low cost polymer and a conductive filler, such as conductive carbon black, are selected.

PRIOR ART

A polymer composite coating of metal materials, such as carrier beads, is known and can generally be obtained by two approaches, solution and powder coating. Solution coating of carriers with a polymer composite solution comprised of a polymer, a conductive filler and solvent can be utilized to prepare conductive carriers, however, trapping of solvent in the solution coating can adversely interfere with the use of the coated materials, for example the residual solvent trapped in the carrier coating reduces the carrier life, and the release of solvent in the developer housing can cause other problems related to the harmful effects of absorbed solvent to various copying machine parts and also the solvent selected may be toxic. Moreover, the solvent recovery operation involved in the solution coating processes is costly. The powder coating of metal surfaces can eliminate the need for solvent, and therefore, many of the problems associated with solution coating; however, powder coating usually requires a polymer powder with a very small size, for example less than 1 to 5 microns. Although polymer powders are available for carrier powder coating, submicron or micron-sized polymer composite particles containing conductive filler to prepare conductive coated carriers that maintain their triboelectric characteristics for extended time periods exceeding, for example, 200,000 images, and which possess the other advantages illustrated herein are desired.

Semisuspension polymerization processes are known, reference U.S. Pat. No. 5,236,629, the disclosure of which is totally incorporated herein by reference. The '629 patent illustrates a process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average volume diameter of from about 0.05 to about 5 microns in water; polymerizing the resulting suspension by heating; and subsequently washing and drying the product. There are some disadvantages with the '629 process which can be alleviated and/or minimized by the polymerization process of the present invention. For example, although most carbon blacks, which are known to be free radical inhibitors, can be used in the '629 process, those carbon blacks which are very strong inhibitors, for example some highly oxidized carbon blacks, can inhibit the polymerization of the '629 process. In the polymerization process of the present invention, there can be selected, for example, very strongly inhibiting carbon blacks. Furthermore, the nature of the conductive filler dispersion in the '629 process is, for example, one of free filler particles physically dispersed in the polymer matrix, while in the polymerization process of the present invention the filler, such as carbon black, contains the polymer prepared in the solution polymerization step chemically grafted or strongly adsorbed onto its surface thereby enhancing its dispersion stability. Therefore, with the present invention there are fewer problems associated with free filler particles as compared to the '629 process if the bulk polymerization step is not conducted to the optimum conversion. The polymerization process of the present invention also provides advantages in obtaining a more uniform dispersion of filler in the final particles primarily because of the grafted or adsorbed polymer on the filler surface. While some additives are difficult to disperse in various monomers, depending on the surface compatibility of the filler and monomers, the invention polymerization process overcomes this difficulty by, for example, chemically grafting or adsorbing polymer on the filler surface during the solution polymerization. The invention solution polymerization, therefore, compatibilizes the filler with the monomer, thereby ensuring better filler dispersion than in the '629 process. This results in fewer final particles without filler, which is particularly important for conductive particles, as there can be a significant decrease in conductivity when even a small fraction of nonconductive particles, that is particles without filler, are mixed in with the conductive particles.

The preparation of polymeric particles for powder coatings can be accomplished by grinding or attrition, precipitation and in situ particle polymerization. Grinding or attrition, especially fluid energy milling, of large polymeric particles or polymeric composite particles containing fillers to the size needed for powder coating, for example less than 1 to 5 microns, is often not desirable both from an economic and functional viewpoint. These particles are difficult to grind and, therefore, grinding or attrition for coating with present milling equipment is costly primarily because of very low processing yield, for example in the range of 5 to 10 weight percent.

Precipitation processes can also be used to prepare polymeric/polymeric composite particles. In one process, the polymer solution is heated to above its melting temperature and then cooled to form particles. In another process, the polymer solution is precipitated using a nonsolvent or the polymer solution is spray dried to obtain polymeric/polymeric composite particles. With these precipitation processes, it can be difficult to achieve low cost, pure polymer, that is, for example, with no or substantially no impurities, such as solvents or precipitants in the resulting polymer particles. It is also difficult to obtain particles with small particle size and narrow particle size distribution, and to control filler distribution throughout each particle's polymer matrix. In the in situ particle polymerization process, polymer particles are prepared by using suspension dispersion, emulsion and semisuspension polymerization. Suspension polymerization can be utilized to prepare polymer particles and polymeric composite particles containing, for example, a conductive filler. However, this process does not, for example, effectively enable particles with a size of less than 5 microns. Although emulsion and dispersion polymerization can be utilized to prepare polymeric particles of a small size, for example less than 5 microns, these processes wherein particle formation is achieved by nucleation and growth do not, it is believed, enable the effective synthesis of particles containing fillers such as conductive fillers.

There is disclosed in U.S. Pat. No. 4,908,665 a developing roller or developer carrier comprised of a core shaft, a rubber layer and a resin coating layer on the surface of the rubber containing conductive fillers for a one component developer. It is indicated in the '665 patent that a conductive developing roller can eliminate variation of the image characteristic due to the absorption of moisture for one component development. This patent thus describes a developing roller for one component developer. U.S. Pat. No. 4,590,141 discloses carrier particles for two component developer coated with a layer of silicon polymer using fluidized bed solution coating. U.S. Pat. No. 4,562,136 discloses a two component dry type developer of carrier particles coated with a silicon resin containing a monoazo metal complex charging. The two component carriers described in the aforementioned two patents are insulating and are not believed to be conductive. There is disclosed in U.S. Pat. No. 4,912,005 a conductive carrier composition coated with a layer of resin containing a conductive particle by solution coating. Residual solvent trapped in the aforementioned coated layer adversely effects the maintainability of carrier electrical properties for an extended time period.

There is disclosed in U.S. Pat. No. 3,505,434 a process wherein particles for fluidized bed powder coating are prepared by dispersing the polymer in a liquid which is heated to above the polymer melting point and stirred causing the polymer particles to form. The particles are then cooled below their melting point and recovered. However, this process does not, for example, enable particles with a size of below 50 microns in average volume diameter.

Also, the suspension polymerization of monomer is known for the formation of polymer/polymeric composite particles generally in a size range of about 200 microns and higher. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

Further, disclosed in U.S. Pat. No. 4,835,084 is a method for preparing pigmented particles and wherein a high concentration of silica powder is used in the aqueous phase to prevent coalescence of the particles. There is also disclosed in U.S. Pat. No. 4,833,060 a process for the preparation of pigmented particles by dissolving polymer in monomer and dispersing in the aqueous phase containing silica powder to prevent coalescence of the particles. However, the silica powder used in both U.S. Pat. Nos. '084 and '060 should be removed using, for example, potassium hydroxide, which is costly, and residual potassium hydroxide and silica materials remaining on the surface adversely affects the charging properties of particles. There is also disclosed in U.S. Pat. No. 3,954,898 a two step polymerization process for the preparation of a thermosetting finished powder. However, this process does not effectively enable it is believed synthesis of particles with a size less than about 100 microns.

Disclosed in the aforementioned U.S. Pat. No. 5,043,404, the disclosure of which is totally incorporated herein by reference, is a semisuspension polymerization process for the preparation of small polymeric particles which are comprised of a mixture of monomer or comonomers, a polymerization initiator, a crosslinking component and a chain transfer component, which are bulk polymerized until partial polymerization is accomplished. The resulting partially polymerized monomer or comonomers is dispersed in water containing a stabilizer component with, for example, a high shear mixer, then the resulting suspension polymerized, followed by washing and drying the submicron polymeric particles. U.S. Pat. No. 5,236,629 discloses a process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product.

The polymerization process described in the present application provides a different process with improvements over the process disclosed in U.S. Pat. No. 5,236,629, and other prior art. These improvements include (1) superior uniformity of the conductive filler in the final particles primarily because of the solution polymerization step in which polymer is grafted or adsorbed onto the surface of the filler; (2) fewer particles containing no conductive filler due to improved dispersion; (3) higher conductivity in the final particles at the same weight percent loading of conductive filler, primarily because of excellent filler dispersion; (4) fewer potential problems with free conductive filler particles contaminating the final product and causing, for example, problems with contamination in the developer housing when the particles are coated on carrier cores; (5) the ability to use fillers which are very strong free radical polymerization inhibitors such as some highly oxidized carbon blacks; and (6) the capability to control the amount of polymer in the organic phase. With the present invention, a process to obtain conductive submicron or micron-sized polymer particles of less than about 1 to about 5 microns in volume average diameter as determined by a scanning electron microscope, each containing conductive fillers evenly and excellently dispersed in the polymer, is provided. These polymeric particles contain from about 1 to about 50 weight percent of a conductive filler, such as carbon black, which is evenly distributed throughout the polymer matrix. This polymerization process permits the preparation of low cost, clean, and dry submicron conductive polymeric particles that can be selected as carrier powder coatings.

In U.S. Pat. No. 5,236,629, recited hereinbefore, the disclosure of which is totally incorporated herein by reference, there is illustrated a process for the preparation of conductive polymeric particles with linear and crosslinked portions, which comprises mixing a monomer with at least one conductive filler, solvent, at least one polymerization initiator, and a chain transfer component; effecting solution polymerization by heating until from about 80 to about 100 weight percent of the monomer has been polymerized; drying the mixture by removing the solvent to yield an intimate blend of polymer with conductive filler; dispersing the aforementioned blend of polymer and conductive filler in at least one monomer with at least one polymerization initiator, a crosslinking agent and a chain transfer agent to form an organic phase; dispersing the resulting organic phase mixture in water containing a stabilizing component to obtain a suspension of particles with an volume average diameter of from about 0.05 to about 5 microns in water; polymerizing the resulting suspension by heating; and subsequently optionally washing and drying the polymeric product. The primary differences between the present invention and that of the above '629 patent, and the advantages of the present invention over the process of the '629 process include: (1) use of an azeotropic distillation process that enables (i) efficient solvent recovery and recycling, (ii) more rapid and effective solvent removal, (iii) a wider selection of drying equipment due to removal of the organic solvent, and (iv) improvement in ease of material handling; and (2) the use of a continuous homogenizer that enables large scale processing.

SUMMARY OF THE INVENTION

Examples of objects of the present invention include:

An object of the present invention is to provide conductive polymeric composite particles and processes thereof with many of the advantages illustrated herein.

In another object of the present invention there are provided manufacturing processes for the preparation of small conductive submicron polymeric composites comprised of a polymer and a conductive filler distributed evenly and in embodiments uniformly throughout the polymer matrix of the composite, or throughout the polymer.

In yet another object of the present invention there are provided economical processes for the preparation of substantially pure, clean and dry conductive small polymeric composite particles comprised of from about 50 to about 99 weight percent of polymer and from about 1 to about 50 weight percent of conductive filler dispersed therein, or distributed throughout the polymer matrix of the composite of polymer and conductive component, as measured by TGA, wherein commercial scale mixing/dispersion equipment can be selected, and wherein product agglomeration is minimized, or avoided.

Another object of the present invention resides in conductive submicron polymeric composite particles with a conductivity of from about $10^{-10}$ $(ohm-cm)^{-1}$ to about 0.10 $(ohm-cm)^{-1}$ and processes for the preparation thereof.

Another object of the present invention resides in processes for generating conductive submicron polymeric composite particles with an average particle diameter size of from about 0.05 micron to about 5 microns.

In another object of the present invention there are provided conductive small polymeric composites which can be selected for two component carrier powder coatings, reference U.S. Pat. Nos. 4,937,166 and 4,935,326, the disclosures of which are totally incorporated herein by reference, and processes for preparing such carriers; and wherein improved dispersion of conductive fillers can be achieved in submicron conductive carrier coating polymeric composite particles.

In another object of the present invention there are provided simple processes for the formation of small conductive polymeric particles, and more specifically, from about 1 to about 5 micron size (volume average throughout) conductive polymeric particles.

Also, in another object of the present invention there are provided simple and economical processes for the formation of conductive submicron polymeric particles that can be selected as carrier coatings, reference U.S. Pat. Nos. 3,590,000; 4,937,166 and 4,935,326, the disclosures of which are totally incorporated herein by reference.

Another object of the present invention resides in simple and economical polymerization processes for the preparation of low cost, clean, and dry small conductive polymeric particles, and more specifically, submicron or micron-size conductive polymeric particles useful as carrier powder coatings.

Additionally, in another object of the present invention there are provided, primarily as a result of the enhanced degree of control and flexibility, processes for the preparation of polymeric particles containing a conductive filler, or fillers with improved flow and fusing properties; and particles that can be selected for conductive carrier powder coating with a triboelectric charge in the range, for example, of from about −30 to about +40 microcoulombs per gram as determined by the known Faraday Cage process.

Another object of this invention provides an azeotropic distillation process for isolation of an intermediate product, which permits the recycling of the solvent stream, and speeds up the isolation process as compared to previous processes involving vacuum drying.

Embodiments of the present invention relate processes for the preparation of conductive polymer particles, each containing a conductive component, filler or fillers. More specifically, in embodiments the present invention relates to processes for the preparation of carrier polymer coatings, which process comprises a solution polymerization of at least one, for example from one to about five, and preferably one, monomer in the presence of at least one initiator, and an organic solvent, and in the presence of a conductive component like a conductive carbon black, and mixing the resulting polymer solution containing the conductive component with a heated aqueous phase whereby the organic solvent is separated, and preferably wherein the separation of solvent is accomplished by an azeotropic distillation, and producing a polymer and conductive component mixture in the form of beads, thereafter grinding the intermediate produced beads to about 100 to about 1,000 microns, drying, and then dissolving in an organic phase comprised of monomer, initiators, and a crosslinking component, followed by mixing the organic phase with an aqueous phase containing a stabilizer, such as polyvinyl alcohol, and an alkali halide, preferably potassium iodide, and thereafter polymerizing by heating, cooling, separating and drying the product comprised of a polymer, such as poly(methyl methacrylate), containing the conductive component in various effective amounts, such as from about 1 to about 50 weight percent, and preferably from about 15 to about 40 weight percent.

Embodiments of the present invention include processes for the preparation of conductive polymer carrier coatings comprising (1) a solution polymerization accomplished by heating between 45° C. and 120° C., of at least one monomer, about 10 to about 30 weight percent, such as methyl methacrylate, in the presence of initiators, about 0.5 to about 3 weight percent, or an initiator, in the presence of about 10 to about 30 weight percent conductive component like a conductive carbon black, and wherein from about 0 to about 2 weight percent of optional additives, such as chain transfer agents, can be selected primarily to reduce the polymer molecular weight; an organic solvent, about 50 to about 80 weight percent, which solvent has been recycled from the subsequent distillation 2; for example, a solvent for the monomer and polymer or prepolymer that is obtained, such solvent including toluene; (2) removing the solvent from the slurry of (1) by azeotropic distillation wherein, for example, the organic solvent, polymer, conductive component slurry is metered into an aqueous phase which is heated from about 85° C. to about 95° C. (Centigrade), and more specifically, wherein the aqueous phase is agitated by mechanical stirring for about 4 to 6 hours, enabling the polymer and conductive component particles to be dispersed into bead particles as the solvent evaporates near its azeotropic boiling point, about 85° C. to about 95° C., resulting in solid composite particles of polymer and conductive component suspended in the aqueous phase at which time the temperature is increased to about 110° C. (Centigrade throughout) to completely remove any excess solvent by evaporation (solvent is recovered and recycled back into (1); (3) isolating the polymer and conductive component composite particles from the aqueous phase by, for example, filtration and thereafter drying, for example, for about 1 to about 10 hours in a dryer and then grinding the particles obtained; (4) dissolving the polymer and conductive component composite of (3) in an organic phase comprised of at least one monomer, selected, for example, in an amount of from about 50 to about 70 weight percent, such monomers including methyl methacrylate, and the like, and containing initiators, or an initiator, for example from about 1 to about 15 weight percent, and a crosslinking agent, from about 0.01 to about 5 weight percent for example, and mixing, which mixing is for an effective period of time, for example preferably from about 4 to about 10 hours; (5) premixing the organic phase with an aqueous phase (organic phase:aqueous phase ratio of, for example, about 10:90 to about 40:60), and aqueous phase comprised of a stabilizer such as polyvinyl alcohol, for example about 0.1 to about 5 weight percent, and an alkali halide, preferably potassium iodide in an amount, for example, of from about 0.5 to about 2 weight percent, followed by circulating the mixture through an inline or continuous homogenizer, for example a Quadro Z-1 inline homogenizer, preferably for a period of from about 10 to about 90 minutes to enable the desired particle size, for example a volume median between about 1 to about 5 microns, and a number median between about 0.1 to about 2 microns as measured by Coulter LS-230 laser diffraction device); (6) transferring the suspension of (5) into a second reaction vessel or reactor, and heating between about 45° C. and about 120° C. to accomplish polymerization; (7) washing the slurry that is obtained, after cooling, with, for example, a mixture of water and an aliphatic alcohol, such as methanol (water:alcohol ratio between about 10:90 and about 100:0), using a decanting centrifuge at each washing stage to separate the wetcake, which is comprised of ~50 weight percent solids (polymer/conductive filler product) and about 50 weight percent liquid (washing mixture of, for example, water and alcohol, and with from about four to about six washing stages being preferred; and (8) drying the resulting wetcake to enable the product of a polymer with a conductive component dispersed therein.

Embodiments of the present invention include a process for the preparation of conductive polymers which comprises (a) mixing at least one monomer with at least one conductive component, solvent, at least one polymerization initiator, and an optional chain transfer component; (b) effecting solution polymerization by heating; (c) removing the solvent by azeotropic distillation in an aqueous phase to generate a mixture of polymer and conductive component; (d) drying and grinding the resulting mixture; thereafter dissolving the product resulting in at least one monomer, at least one initiator, and at least one crosslinking component, and an optional chain transfer agent to form an organic phase; (e) mixing said organic phase with a second aqueous phase comprised of water, stabilizer, and an alkali halide; (f) polymerizing the resulting suspension by heating; and (g)

subsequently optionally washing and drying the polymeric product, and which product is comprised of polymer and conductive component dispersed therein; a process wherein at least one is one, and the aqueous phase for the azeotropic distillation is comprised of water, or water and a stabilizer of polyvinyl alcohol; a process wherein the alkali halide is potassium iodide; a process wherein there is accomplished washing and drying of the polymeric product, and which product is comprised of polymethyl methacrylate polymer and a conductive component of carbon black; a process wherein washing is accomplished with a mixture of water and an alcohol, and the solvent is an organic component; a process wherein washing is accomplished with a mixture of water and an alcohol, which water is present in an amount of from about 75 to about 95 weight percent; a process wherein washing is accomplished with a mixture of water and the alcohol methanol; a process wherein the mixing of the organic phase and the aqueous phase is accomplished for from about 5 to about 20 minutes, followed by further mixing for a period of from about 10 to about 90 minutes, and the solvent is the organic solvent toluene; a process wherein the further mixing is with an inline homogenizer, or with a continuous homogenizer; a process wherein the heating is from about 65° to about 125° C.; a process wherein the mixture contains from 2 monomers to about 20 monomers; a process wherein the solution and the suspension polymerization are accomplished by heating; a process wherein heating is accomplished at a temperature of from about 30° C. to about 200° C.; a process wherein heating is accomplished at a temperature of from about 45° C. to about 120° C.; a process wherein the number average molecular weight of the solution polymerization product (b) is from about 1,000 to about 50,000, and the weight average molecular weight of the solution polymerization product is from about 5,000 to about 100,000; a process wherein the number average molecular weight of the suspension polymerization product (f) is between about 3,000 to about 500,000, and the weight average molecular weight of the suspension polymerization product is between about 5,000 to about 2,000,000; a process wherein the mixing of the conductive filler, or component in the mixture of monomers and solvent prior to the solution polymerization is achieved with mixing; wherein (e) the dispersion of the mixture of conductive filler polymer and monomer in water containing the stabilizing component is accomplished with a high shear mixer, and wherein the product of solution polymerization is separated from the organic solvent by azeotropic distillation; a process wherein the ratio of the crosslinked polymer/linear polymer in the final product is from about 0.001 to about 0.25; a process wherein the conductive polymer product obtained possesses an average volume particle diameter of from about 0.05 micron to about 5 microns; a process wherein the weight percentage of conductive component in the final product is from about 1 to about 50 and wherein the conductive component is evenly distributed throughout the polymer matrix of the final product; a process wherein the conductivity of the final conductive polymer product is from about $10^{-10}$ to about 0.10 (ohm-cm)$^{-1}$ as determined by measuring the electrical resistivity of a pressed pellet thereof and wherein the triboelectric charge of the polymer product is from about +40 to about −40 microcoulombs per gram; a process wherein the monomer is selected from the group consisting of methylstyrene, p-chlorostyrene, monocarboxylic acids and the derivatives thereof; dicarboxylic acids with a double bond; vinyl ketones; vinyl naphthalene; unsaturated mono-olefins; vinylidene halides; N-vinyl compounds; fluorinated vinyl compounds and mixtures thereof; a process wherein the monomer is selected from the group consisting of acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate, vinyl benzoate; vinylidene chloride; pentafluoro styrene allylpentafluorobenzene, and N-vinyl pyrrole; a process wherein the monomer is methyl methacrylate, the polymer is poly(methyl methacrylate), and the conductive component is carbon black; a process wherein the conductive component is selected from the group consisting of conductive carbon blacks, metal oxides, metals, and mixtures thereof; a process wherein the conductive component is selected from the group consisting of acetylene black, VULCAN BLACK®, BLACK PEARL L®, CONDUCTEX SC ULTRA BLACK®, CONDUCTEX 975 BLACK®, KETJEN BLACK®, REGAL 330®, RAVEN 5250®, RAVEN 5750®, iron oxides, TiO, $SnO_2$, and iron powder; a process wherein the polymerization initiator is selected from the group consisting of azo compounds and peroxides; a process wherein the polymerization initiator is benzoyl peroxide, lauroyl peroxide, 1-1-(t-butylperoxy)-3,3,5-trimethylcyclohexane, n-butyl-4,4-di-(t-butylperoxy) valerate, dicumyl peroxide, 2,2'-azodimethylvaleronitrile, 2,2'-azoiso butyronitrile, azobiscyclohexanenitrile, or 2-methylbutyronitrile, selected in an amount of from about 0.5 to about 3 weight percent, and wherein the stabilizing component is selected from the group consisting of nonionic and ionic water soluble polymeric stabilizers, selected in an amount of from about 0.1 to about 5 weight percent; a process wherein the stabilizing component is selected from the group consisting of methyl cellulose, ethyl cellulose, hydroxypropyl cellulose, the sodium salt of carboxyl methyl cellulose, polyacrylate acids, polyvinyl alcohol, gelatins, starches, gums, alginates, zein and casein, selected in an amount of form about 0.1 to about 5 weight percent, and wherein the crosslinking component is selected from the group consisting of compounds with two or more polymerizable double bonds, selected in an amount of from about 0.01 to about 5 weight percent; a process wherein the crosslinking component is divinylbenzene, divinyinaphthalene, ethylene glycol diacrylate, or divinylether, selected in an amount of from about 0.01 to about 5 weight percent, and wherein the chain transfer component is selected from the group consisting of mercaptans and halogenated hydrocarbons, selected in an amount of from about 0.1 to about 2 weight percent; a process wherein the chain transfer component is carbon tetrachloride, butylmercaptan, or laurylmercaptan; a carrier comprised of a core and as a coating the polymer obtained by the process indicated herein; a process for the preparation of conductive polymers with an average volume particle size of from about 0.05 to about 5 microns which comprises (1) a solution polymerization of at least one monomer in the presence of initiators, or an initiator, an organic solvent, in the presence of a conductive component, and optional additives; (2) removing the solvent from the resulting slurry of (1) by azeotropic distillation and wherein the organic solvent, polymer, conductive component slurry is added, or admixed with a heated aqueous phase, to enable the polymer slurry to be dispersed in droplets upon addition to the aqueous phase, and wherein the solvent evaporates resulting in solid beads of polymer and conductive component; (3) drying the polymer and conductive component particles, and grinding; (4) dissolving the prepolymer and conductive component of (3) in an organic phase comprised of at least one monomer containing initiators, or an initiator, and a crosslinking agent, and mixing; (5) premixing the organic phase with an aqueous phase comprised of polyvinyl alcohol and potassium iodide, and wherein the potassium iodide is added prior to particle formation, followed by circulating the mixture through an inline or continuous homogenizer; (6) transferring the suspension of (5) into a second reaction vessel or reactor, and heating to accomplish polymerization; (7) washing the slurry obtained, after cooling with a mixture of water and an aliphatic alcohol; and (8) drying the wetcake to enable the product of a polymer containing from about 1 to about 50 weight percent of a conductive component dispersed therein; a process wherein the volume average particle size is from about 1 to about 5 microns, the additional additives are chain transfer agents, one is from 1 to about 3, and the conductive component is carbon black; a process for the preparation of conductive polymers which comprises (a) mixing monomer with conductive component, solvent, polymerization initiator, and an optional chain transfer component; (b) effecting solution polymerization by heating; (c) removing the solvent by azeotropic distillation in an aqueous phase to generate a mixture of polymer and conductive component; (d) drying and grinding the resulting mixture; thereafter dissolving the product resulting in monomer, initiator, and crosslinking component, and an optional chain transfer agent to form an organic phase; (e) mixing the organic phase with a second aqueous phase comprised of water, stabilizer, and an alkali halide; (f) polymerizing the resulting suspension by heating; and (g) subsequently washing and drying the polymeric product, and which product is comprised of polymer and conductive component; and a process wherein there is accomplished washing and drying of the polymeric product comprised of polymethylmethacrylate polymer with the conductive component carbon black dispersed therein, and wherein the carbon black is present in an amount of from 1 to about 50 weight percent, and wherein the polymer conductive component size diameter is from about 1 to about 5 microns in volume average diameter.

With the present invention in embodiments, there is selected an azeotropic distillation for isolation of the polymer/conductive product, and a continuous flow through homogenizer for particle formation; wherein there is accomplished a solution polymerization of vinyl monomer in the presence of carbon black, followed by feeding the resulting polymer/carbon black mixture into a heated aqueous phase whereby the solvent selected is evaporated resulting in aqueous polymer/carbon black particulate suspension; redissolving in a liquid vinyl monomer/initiator/crosslinker mixture, dispersing in aqueous polyvinyl alcohol and potassium iodide solution and mixing with an inline or continuous homogenizer, to generate microdroplets, followed by polymerization to provide the product of polymer, such as polymethylmethacrylate with carbon black dispersed therein; and wherein solution polymerization of monomer, such as methyl methacrylate, carbon black, toluene, and initiators, is accomplished by heating with stirring in a reaction vessel, or tank, to polymerize the monomer, and the product wet slurry resulting is directed to a holding tank. At a controlled flow rate, the slurry from the holding tank is directed into another separate reaction vessel with hot water, wherein the toluene is evaporated, and water and the solution polymerization particles are removed, followed by filtration of the water, and drying and grounding of the solid particles. The solid particles are then added to an organic phase in another tank, which organic phase contains monomer of methyl methacrylate, crosslinker, such as divinylbenzene, and initiators followed by high shear mixing with water, polyvinyl alcohol and potassium iodide, which mixing is with a Quadro Z-3 Inline homogenizer, and wherein particles are formed. Subsequently, suspension polymerization is accomplished in another separate tank by simple mixing and heating to polymerize, followed by cooling, separating, washing, and drying the product composite of polymer/carbon black.

The viscosity of the organic phase can in embodiments be an important factor in controlling the dispersion of the conductive filler in the particles, and which viscosity can be adjusted by, for example, the percentage of polymer in the mixture. Typical viscosities are in the range of from about 10 centipoise to about 100,000, and from about 1,000 to about 50,000 centipoise, as measured using a Brookfield Model DVII+viscometer using spindle #063 at 2 rpm. The aforementioned mixture is then dispersed in water containing a stabilizing component with, for example, a continuous high shear mixer to permit the formation of a suspension containing small, less than about 10 microns, and more specifically, from about submicron to about 5 microns, for example, particles therein, and thereafter, transferring the resulting suspension product to a reactor, followed by polymerization until complete conversion to the polymer product is achieved. The polymer product can then be cooled, washed and dried. More specifically, the process of the present invention is comprised of (1) mixing at room temperature, about 25° C., a monomer or comonomers with one or more conductive fillers, solvent, polymerization initiators, and a chain transfer component; (2) effecting solution polymerization by increasing the temperature of the aforementioned mixture to from about 45° C. to about 120° C. until from about 80 to about 100 weight percent of monomer or comonomers has been polymerized; (3) removing and recovering the solvent using azeotropic distillation in an aqueous phase and then filtering off the aqueous phase to yield an intimate blend of polymer and conductive filler in the form of beads which are dried and then ground using, for example, a mill; (4) dispersing this blend of polymer and conductive filler in monomer or comonomers with at least one polymerization initiator, a crosslinking component and an optional chain transfer component to provide an organic phase; the molecular weight and concentration of polymer in this organic phase affects the viscosity of the organic phase which is an important factor in controlling the conductive filler distribution in the particles; (5) dispersing the organic phase in from about 2 to about 5 times its volume of water containing from about 0.5 to about 5 weight percent of a stabilizing component, such as polyvinyl alcohol, and about 0.5 to 2 weight percent potassium iodide to form a suspension with a particle size diameter of from about 0.05 micron to about 5 microns of particles containing from about 1 to about 50 weight percent of a conductive filler, or conductive fillers using a high shear mixer; (6) transferring the resulting suspension to a reactor and polymerizing the suspension by increasing its temperature to from about 45° C. to about 120° C. to allow the complete conversion of monomer or comonomers to polymer; (7) cooling the product and washing the product with water and/or an alcohol like methanol; (8) separating polymer particles from the water/methanol by means of filtration or centrifugation; and (9) drying the polymeric particles with conductive filler therein.

The present invention is directed to the preparation of small conductive polymeric particles, that is with, for example, a volume average particle diameter in the range of from about 0.05 micron to about 5 microns, preferably from about 0.1 to about 3 microns, or from 1 to about 5, as measured by Coulter LS 230 laser diffraction device, and which particles contain from about 1 to about 50 percent and preferably about 10 to 25 weight percent of conductive filler like carbon black, distributed throughout the polymer matrix of the particles, and which polymer particles have a number and weight average molecular weight of from between about 3,000 to about 500,000 and from between about 5,000 to about 2,000,000, respectively, as determined by gel permeation chromatography. Further, the process of the present invention is directed to the preparation of conductive polymeric particles of average diameter of from about 0.05 micron to about 5 microns containing from about 10 to about 30 weight percent of a conductive filler and from about 70 to about 90 weight percent of a polymeric material, or polymer. The polymer can be comprised of linear and crosslinked portions with a number average molecular weight of the linear portion being from about 3,000 to about 500,000, and a weight average molecular weight of from about 5,000 to about 2,000,000, and from 0.1 to about 25 weight percent of a crosslinked portion, and which polymer product is useful as carrier coatings.

More specifically, the process of the present invention in embodiments is directed to the preparation of conductive polymeric particles with a potassium iodide solution and azeotropic distillation, as indicated herein, of an average particle diameter in the range of from about 0.1 to about 5.0 microns, conductive filler distributed evenly throughout the polymer matrix particle as measured by TEM, which polymer contains a linear portion having a number average molecular weight in the range of from about 3,000 to about 500,000, and a weight average molecular weight of from about 5,000 to about 2,000,000, and from about 0.1 to about 25 weight percent of a crosslinked portion. This process is as indicated herein and specifically comprises, for example, (1) mixing a monomer or comonomers with a conductive filler with the ratio of monomer or comonomers to conductive filler being from about 10/1 to about 1/10, a solvent with the ratio of monomer or comonomers to solvent being from about 20/1 to about 1/20, at least one polymerization initiator with the ratio of monomer or comonomers to initiator being from about 100/2 to about 100/20, and a chain transfer component with the ratio of monomer or comonomers to the chain transfer component being from about 100/0 to about 100/1; (2) effecting solution polymerization by increasing the temperature of the mixture to from about 45° C. to about 120° C. until from about 80 to about 100 weight percent of monomer or comonomers has been converted to polymer with a number average molecular weight of from about 1,000 to about 50,000, and a weight average molecular weight of from about 5,000 to about 100,000; (3) removing the solvent using azeotropic distillation to form polymer/conductive filler beads which are then dried and ground; (4) dispersing this polymer/filler blend in monomer or monomers with the ratio of polymer/filler blend to monomers being from about 5/100 to about 100/100 with at least one polymerization initiator, with the ratio of monomer or comonomers to initiator being from about 100/2 to about 100/20, a crosslinking component with the ratio of monomer or comonomers to the crosslinking component being from about 100/0.01 to about 100/5, and an optional chain transfer component, with the ratio of monomer or comonomers to the chain transfer component being from about 100/0.01 to about 100/1 to yield an organic phase; (5) dispersing, with a high shear mixer, the resulting organic phase from about 2 to about 5 times its volume in water containing from about 1 to about 5 weight percent of a stabilizing component, preferably polyvinyl alcohol having a weight average molecular weight of from about 1,000 to about 10,000, and potassium iodide of from about 0.5 to 2 weight percent to form a suspension containing particles with a particle size diameter of from 0.1 to about 5.0 microns; (4) transferring the resulting suspension to a reactor and polymerizing the suspension by increasing its temperature to from about 45° C. to about 120° C. to provide for the conversion of monomer or comonomers to polymer; (5) washing the resulting product with equal volumes of methanol and/or water from about 4 to about 6 times; (6) separating the polymeric particles from water/methanol by a number of suitable means, for example by filtration or centrifugation; and (7) drying the polymeric particles. Optionally, the drying (3) above can be eliminated, and the solvent can be removed by an appropriate technique after the monomers have been added as in step (4).

Illustrative examples of monomer, from one to about five for example, and preferably one, or comonomers present in an amount of, for example, from about 80 to about 99 weight percent, and more preferably from about 80 to about 90 weight percent include vinyl monomers comprised of styrene and its derivatives such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole, and fluorinated monomers such as pentafluoro styrene, allyl pentafluorobenzene, and the like; and mixtures thereof.

Illustrative examples of polymerization initiators present in an amount of, for example, from about 0.1 to about 20 weight percent of monomer, and more preferably from about 1 to about 5 weight percent include azo compounds, such as 2,2'-azobis(2,4-dimethyl valeronitrile), 2,2'-azobis(2-methyl butyronitrile), 1,1'-azobis(cyanocyclohexane), and the like, and peroxides, such as benzoyl peroxide, lauryl peroxide, 1-1-(t-butylperoxy)-3,3,5-trimethylcyclohexane, n-butyl-4, 4-di-(t-butylperoxy) valerate, dicumyl peroxide, and the like.

Crosslinkers selected for the process of the present invention are known and can be comprised of compounds having two or more polymerizable double bonds. Examples of such compounds include aromatic divinyl compounds such as divinylbenzene and divinylnaphthalene; carboxylic acid esters having two double bounds such as ethylene glycol diacrylate, ethylene glycol dimethylacrylate and the like; and divinyl compounds such as divinyl ether, divinyl sulfite, divinyl sulfone and the like. Among these, divinylbenzene is particularly useful. The crosslinking component is preferably present in an amount of from about 0.1 to about 5 parts by weight in 100 parts and, more preferably, from 0.2 to 1 part by weight of the monomer or comonomers.

Examples of conductive fillers present in effective amounts of, for example, from about 1 to about 50, and preferably from about 10 to about 30 weight percent, and the like, and which amounts can in embodiments be based on (1) how much filler is needed for minimum effect on conductivity, and (2) achieving a conductivity plateau, include conductive carbon blacks such as acetylene black, available from Chevron Chemical, VULCAN BLACK™, BLACK PEARL L®, KETJEN BLACK EC600JD®, available from AKZO, CONDUCTEX SC ULTRA™, available from Columbian Chemical, metal oxides such as iron oxides, TiO, $SnO_2$, metal powders such as iron powder, and the like.

Stabilizers present in an amount of, for example, from about 0.1 to about 5 weight percent and, more preferably, from 1 to 4 weight percent of water are selected from the group consisting of both nonionic and ionic water soluble polymeric stabilizers such as methyl cellulose, ethyl cellulose, hydroxypropyl cellulose, block copolymer such as PLURONIC E87™ available from BASF, the sodium salt of carboxyl methyl cellulose, polyacrylate acids and their salts, polyvinyl alcohol, gelatins, starches, gums, alginates, zein, casein and the like; and barrier stabilizers such as tricalcium phosphate, talc, barium sulfate and the like. Polyvinyl alcohol with a weight average molecular weight of from about 1,000 to about 10,000 is particularly useful.

Chain transfer components selected, which primarily function to control the polymer molecular weight by inhibiting chain growth, include mercaptans, such as laurylmercaptan, butylmercaptan and the like, or halogenated carbons, such as carbon tetrachloride or carbon tetrabromide, and the like. The chain transfer agent is preferably present in an amount of from about 0.01 to about 1 weight percent and more preferably from 0.1 to 0.5 weight percent of monomer or comonomers. Also, stabilizer present on the surface of the polymeric particles can be washed using an alcohol, such as, for example, methanol and the like, or water. Separation of washed particles from solution can be achieved by any classical separation technique such as filtration, centrifugation and the like. Classical drying techniques, such as vacuum drying, freeze drying, spray drying, fluid bed drying and the like, can be selected for drying of the polymeric particles.

Examples of each of the aqueous phase components include polyvinyl alcohol between about 0.5 and 5 weight percent, and potassium iodide between about 0.5 and 2 weight percent.

Illustrative specific examples of polymer or copolymers present in an amount of about 50 to about 99 weight percent, more preferably from 70 to 95 weight percent, and from about 5 to about 30 percent in embodiments containing, for example, both a linear and a crosslinked portion in which the ratio of crosslinked portion to linear portion is from about 0.001 to about 0.25, and the number and weight average molecular weight of the linear portion is from about 3,000 to about 500,000 and from about 5,000 to about 2,000,000, respectively, include vinyl polymers of polystyrene and its copolymers, poly(methyl methacrylate) and copolymers thereof, unsaturated polymers or copolymers such as styrene-butadiene copolymers, fluorinated polymers or copolymers such as polypentafluorostyrene, polyallylpentafluorobenzene, and the like.

The polymer with conductive filler or conductive component obtained with the processes illustrated herein can be selected as carrier powder coatings, which carriers contain, for example, a core, such as steel, ferrite, and the like, and which carrier can be admixed with toner compositions comprised of resin particles, pigment particles and optional additives, such as charge control components, reference U.S. Pat. No. 4,560,635, the disclosure of which is totally incorporated herein by reference, enabling the formation of a developer composition useful in electrophotographic imaging, printing and digital processes. Generally, from about 2 to about 5 parts of toner per 100 parts of carrier are mixed.

The following Examples are being submitted to further define various species of the present invention. These Examples are intended to be illustrative only and are not intended to limit the scope of the present invention. Also, parts and percentages are by weight unless otherwise indicated.

EXAMPLE 1

In a 65 gallon tank, 30.5 kilograms of Conductex SC Ultra carbon black were added to 20.25 kilograms of methyl methacrylate (MMA), and 95 kilograms of toluene (recycled). This slurry was transferred to a 50 gallon reaction vessel to which was added a solution of 1.45 kilograms of 1,1'-azobis(cyanocyclohexane) and 0.44 kilogram of Lucidol 75, a benzoyl peroxide, 75 percent of benzoyl peroxide, and 25 percent of moisture, in 8 kilograms of toluene. The resulting mixture was stirred mechanically with a pitch blade impeller at 300 rpm and was heated to 95° C. for 6 hours, and then ramped to 110° C. at a rate of 0.143° C./minute, and thereafter cooled to room temperature, about 25° C. throughout. The resulting solution polymer slurry was removed from the reaction vessel and charged into a 50 gallon tank, and to a second empty tank, or reaction vessel were charged 125 kilograms of water (the water was placed or introduced into the reaction vessel after the slurry had been transferred to a separate tank). Azeotropic distillation: the water was heated to 90° C., and 80 kilograms of the solution polymer slurry were added to the reactor at a rate of ~0.5 kilogram/minute. The toluene evaporated to a condenser and was collected for recycling. After complete addition of the slurry, the temperature was raised to 100° C. to complete toluene removal, and then was cooled to room temperature. At this point, the water contained bead sized particles of the polymer/carbon black composite (~1 micron size). This mixture was transferred to a filtration centrifuge for removal of excess water, and the resulting beads were dried in a vacuum dryer for about 8 hours, and then the particles were ground through a 0.045 inch screen in a comill to provide the final carbon black filled PMMA (polymethylmethacrylate) prepolymer. This procedure was repeated for the remaining solution polymer slurry (~80 kilograms). The composition of the carbon black filled prepolymer was 40.7 weight percent of PMMA, (polymethylmethacrylate), 57.9 weight percent of carbon black, and 1.4 weight percent of volatile material as measured by TGA.

16.6 Kilograms of the carbon black filled PMMA polymethylmethacrylate prepolymer were dispersed in 34.8 kilograms of methylmethacrylate and 0.225 kilogram of divinylbenzene by stirring in a 30 gallon reactor for 7 hours. The stirring was turned off overnight, and was then restarted the next day, about 18 hours later. After 1 hour stirring, 3.0 kilograms of 2,2'-azobis(2,4-dimethyl valeronitrile) and 0.75 kilogram of 2,2'-azobis(2-methyl butyronitrile) were added, and stirring was continued for 30 minutes at which point 0.98 kilogram of Lucidol 75 benzoyl peroxide was added. After 120 minutes of stirring at room temperature, about 25° C., the mixture was added to an aqueous phase of 4.29 kilograms of polyvinyl alcohol and 1.88 kilograms of potassium iodide in 167.4 kilograms of water. This mixture was then circulated through a Quadro Z-3 inline homogenizer for 30 minutes to create a microsuspension. This slurry was transferred to a 100 gallon reaction vessel stirred at 90 rpm, and at which point the temperature was increased to 60° C. for 1.5 hours, to 80° C. for 1.5 hours, and then cooled. The microsuspension was then washed with a methanol/water (216 kilograms/24 kilograms) mixture four times, and once with 80 kilograms of water. The wetcake was then vacuum dried for ~8 hours, and was then comilled through a 0.045 inch screen to provide the final product.

The final product was comprised of 78.6 weight percent poly(methyl methacrylate), 20.8 weight percent carbon black, and 0.6 weight percent volatile material, as measured by thermal gravimetric analysis. The mid-point glass transition temperature of the product was 117.4° C. as measured by DSC. The volume median particle size of the final product was 3.76 microns, and the number median particle size of the product was 0.27 micron, as measured using a Coulter LS 230 diffraction device; 11 percent of the final particles by volume were between 10 and 30 microns (1 gram of the final product was pressed into a pellet under a pressure of 20,000 p.s.i.; the pellet had a diameter of about 1.3 centimeters and a thickness of about 0.7 centimeter; the resistance of the pellet was measured with an electrometer and the volume resistivity was calculated to account for the size of the pellet; four or five pellets were made and the average was taken). The volume resistivity for a pellet of the final product was 55 ohm/centimeter.

0.7 Gram of the resulting poly(methyl methacrylate) final product particles containing carbon black was mixed with 100 grams of Hoeganoes steel core carrier with an average bead diameter of 90 microns in a Munson type mixer at room temperature. The poly(methyl methacrylate) final product particles containing carbon black were then fused on the surface of the carrier at 350° F. in a rotary kiln furnace. The functional evaluation of the resulting carrier in the Xerox Corporation 5100 two component development system indicated a triboelectric charge (tribo) of 26 microcoulombs per gram, as determined by the known Faraday Cage method, and a conductivity of $10^{-8}$ $(ohm-cm)^{-1}$, as measured in a Gutman cell.

COMPARATIVE EXAMPLE I

In a 4 liter glass reactor, 780 grams Conductex SC Ultra carbon black were added to a mixture of 520 grams of methyl methacrylate, 2,750 grams of toluene, and 21.6 grams of dodecanethiol. To this mixture were added 21.6 grams of 2,2'-azobis(2,4-dimethylvaleronitrile), and 8.7 grams of benzolyl peroxide. The reactor was placed in a water bath and was stirred at 350 rpm. The water bath was heated to 70° C. for 3 hours, and then 85° C. for 2 hours, and was then cooled to room temperature. The slurry was poured into a foil tray that was placed in a vacuum oven. The toluene was evaporated by vacuum drying. The dry material was a hard cake that was broken down by hand and was then ground in a coffee grinder. The resulting PMMA and carbon black composite prepolymer consisted of 41.0 weight percent PMMA, 58.2 weight percent carbon black, and 0.8 weight percent volatiles, as measured by TGA. This procedure was repeated to prepare sufficient prepolymer for the next step.

In a 10 liter glass vessel, 2,216 grams of PMMA and carbon black prepolymer were mixed into 4,644 grams of methyl methacrylate and 29.9 grams of divinylbenzene. This mixture then was stirred for 2 days at 350 rpm with a pitch blade impeller. 400 Grams of 2,2'-azobis(2,4-dimethylvaleronitrile) and 100 grams of benzoyl peroxide were added to the *resulting mixture and stirred for 2 hours. The mixture was poured into a Kady Mill homogenizer which contained a mixture of 880 grams of polyvinyl alcohol in 21,120 grams of water. The Kady Mill was started, and the mixture was homogenized for 5 minutes at 8,000 rpm. 250 Grams of potassium iodide (KI) were stirred into the slurry, and it was transferred to a 10 gallon stainless steel reaction vessel. The reactor was then heated to 60° C. for 2 hours and then to 85° C. for 1 hour, and was then cooled to room temperature. The final slurry was washed once with 113 kilograms of methanol, once with a mixture of 55 kilograms of methanol and 55 kilograms of water, and once with a mixture of 15 kilograms of methanol and 90 kilograms of water. The final wetcake was dried in a vacuum oven, and then ground with a comill using a 0.045 inch screen.

The final product consisted of 79.3 weight percent PMMA, 19.6 weight percent carbon black, and 1.1 weight percent volatiles, as measured by TGA. The glass transition temperature was 107.1° C. as measured by DSC. The volume median particle size was 5.53 microns and the number median particle size was 0.16 micron. 38 Percent of the particles by volume were larger than 10 microns (these are aggregates; this occurs if KI is not added before homogenization; in Example 1 only 11 percent of the particles are larger than 10 microns). The pellet resistivity was 277 ohm/centimeters (the pellet resistivity is significantly lower in Example 1).

COMPARATIVE EXAMPLE II

An Example was accomplished using the process disclosed in U.S. Pat. No. 5,236,629, and more specifically REGAL 330® carbon black (82 grams) was dispersed in 510 grams of methyl methacrylate monomer with 40 grams of 2,2'-azobis(2,4-dimethyl valeronitrile), 16.0 grams of benzoyl peroxide and 3.0 grams of divinylbenzene crosslinking agent. This organic phase was partially bulk polymerized by heating to 45° C. until 12 weight percent of the monomer had been converted to polymer, and then cooled to 10° C. The resulting mixture was then mixed with 2,200 milliliters of water containing 4 weight percent of polyvinyl alcohol (molecular weight $M_W$ was 3,000) and vigorously stirred at 10,000 rpm for 5 minutes. The suspension polymerization temperature was increased to 60° C. for 2 hours, and then to 85° C. for 1 hour. The microsuspension product was washed and dried as in Example 1. SEM photomicrographs of the dry product indicated that the average particle size diameter of the polymer product was 0.9 micron. The volume resistivity of the dry product was 3,530 ohm-cm compared to 55 ohm-cm in Example 1, as determined by measuring the electrical resistance of a pressed powder pellet by the process of Example 1. Transmission electron microscopy showed approximately 3 to 4 percent of unpigmented particles compared to less than 1 percent of unpigmented particles for Example 1.

0.7 Gram of the resulting powder was mixed with 100 grams of Hoeganoes steel core carrier with an average bead diameter of 90 microns in a Munson type mixer at room temperature. This mixture was then placed in a rotary kiln furnace at 350° F. to fuse the poly(methyl methacrylate) particles containing carbon black to the steel carrier. The functional evaluation of the resulting carrier in the Xerox Corporation 5100 two component development system indicated a triboelectric charge (tribo) of 28 microcoulombs per gram ($\mu$C/gram) compared to 26 microcoulombs per gram for Example 1, and a conductivity of $10^{-9}$ $(ohm-cm)^{-1}$, as compared to $10^{-8}$ $(ohm-cm)^{-1}$ for Example 1. Thermal gravimetric analysis evidenced that the carbon black content was 12.6 weight percent. The modified semisuspension polymerization process of the present invention produced more conductive polymer particles and more conductive carrier than the '629 process (see Example 1).

COMPARATIVE EXAMPLE II

The process of Comparative Example II was repeated except that styrene monomer was used instead of methyl methacrylate. The resulting product had an average particle size of 0.7 micron with a conductivity of $10^{-3}$ (ohm-cm)$^{-1}$ and glass transition temperature of 102° C. The same carrier coating as described in Comparative Example II was used resulting in a 0.6 weight percent coarse fraction. The coated carrier had a tribo of 15 microcoulombs per gram and a conductivity of $10^{-8}$ (ohm-cm)$^{-1}$.

COMPARATIVE EXAMPLE IV

The process of Comparative Example II was repeated except that 150 grams of CONDUCTEX 975™ carbon black were used. The resulting polymeric product had an average particle size diameter of 0.7 micron and a glass transition temperature of 115° C. The same carrier coating as described in Comparative Example II was used resulting in a coarse fraction of 0.5 weight percent. The coated carrier had a tribo charge of 28 microcoulombs per gram and a conductivity of $10^{-6}$ (ohm-cm)$^{-1}$ as determined by the Faraday Cage method.

COMPARATIVE EXAMPLE V

The process of Comparative Example II was repeated except 50 grams of acetylene black (Chevron Shawinigan Company) were used. The resulting polymeric product had an average particle size of 0.6 micron with glass transition temperature of 111° C. The same carrier coating process as described in Comparative Example II was used resulting in a coarse fraction of 0.3 weight percent. The coated carrier had a tribo charge of 31 microcoulombs per gram and a conductivity of $10^{-10}$ (ohm-cm)$^{-1}$.

COMPARATIVE EXAMPLE VI

The process of Comparative Example II was repeated except that pentafluorostyrene monomer was used. The resulting product had an average particle size of 0.9 micron and glass transition temperature of 106° C. The same carrier coating as described in Comparative Example II was used resulting in a 0.2 weight percent coarse fraction. The coated carrier had a tribo charge of −25 microcoulombs per gram.

Other modifications of the present invention may occur to those skilled in the art subsequent to a review of the present application. The aforementioned modifications, including equivalents thereof, are intended to be included within the scope of the present invention.

What is claimed is:

1. A process for the preparation of a conductive polymer product which comprises (a) mixing at least one monomer with at least one electrically conductive component, solvent, at least one polymerization initiator, and an optional chain transfer component; (b) effecting solution polymerization by heating; (c) removing said solvent by azeotropic distillation in an aqueous phase to generate a mixture of polymer and electrically conductive component; (d) drying and grinding the resulting mixture; thereafter dissolving the intermediate product in a solution comprising solvent, at least one monomer, at least one initiator, and at least one crosslinking component, and an optional chain transfer agent to form an organic phase; (e) mixing said organic phase with a second aqueous phase comprised of water, stabilizer, and an alkali halide to form a suspension; (f) polymerizing the resulting suspension by heating; and (g) subsequently optionally washing and drying the polymeric product, and which product is comprised of polymer and conductive component dispersed therein.

2. A process in accordance with claim 1 wherein said aqueous phase for the azeotropic distillation is comprised of water, or water and a stabilizer of polyvinyl alcohol.

3. A process in accordance with claim 1 wherein said alkali halide is potassium iodide.

4. A process in accordance with claim 1 wherein there is accomplished washing and drying of the polymeric product, and which product is comprised of polymethyl methacrylate polymer and a conductive component of carbon black.

5. A process in accordance with claim 4 wherein washing is accomplished with a mixture of water and an alcohol, which water is present in an amount of from about 75 to about 95 weight percent.

6. A process in accordance with claim 1 wherein said mixing of said organic phase and said second aqueous phase is accomplished for from about 5 to about 20 minutes, followed by further mixing for a period of from about 10 to about 90 minutes, and said solvent is the organic solvent toluene; and wherein said further mixing is with an inline homogenizer, or with a continuous homogenizer.

7. A process in accordance with claim 1 wherein said heating of step (f) is from about 65° to about 125° C.

8. A process in accordance with claim 1 wherein the mixture contains from 2 monomers to about 20 monomers.

9. A process in accordance with claim 1 wherein the solution and the suspension polymerization are accomplished by heating; wherein heating is accomplished at a temperature of from about 30° C. to about 200° C.

10. A process in accordance with claim 1 wherein the number average molecular weight of the solution polymerization product (b) is from about 1,000 to about 50,000, and the weight average molecular weight of the solution polymerization product is from about 5,000 to about 100,000; and wherein the number average molecular weight of the suspension polymerization product (f) is between about 3,000 to about 500,000, and the weight average molecular weight of the suspension polymerization product is between about 5,000 to about 2,000,000.

11. A process in accordance with claim 1 wherein the mixing of step (e) is accomplished with a high shear mixer, and wherein the product of solution polymerization is separated from the organic solvent by azeotropic distillation.

12. A process in accordance with claim 1 wherein the conductive polymer product obtained possesses an average volume particle diameter of from about 0.05 micron to about 5 microns.

13. A process in accordance with claim 2 wherein the weight percentage of conductive component in the final product is from about 1 to about 50 and wherein the conductive component is evenly distributed throughout the polymer matrix of the final product.

14. A process in accordance with claim 1 wherein the conductivity of the final conductive polymer product is from about $10^{-10}$ to about 0.10 (ohm-cm)$^{-1}$ as determined by measuring the electrical resistivity of a pressed pellet thereof and wherein the triboelectric charge of the polymer product is from about +40 to about −40 microcoulombs per gram.

15. A process in accordance with claim 1 wherein the monomer of step (a) is selected from the group consisting of methylstyrene, p-chlorostyrene, monocarboxylic acids and the derivatives thereof; dicarboxylic acids with a double bond; vinyl ketones; vinyl naphthalene; unsaturated monoolefins; vinylidene halides; N-vinyl compounds; fluorinated vinyl compounds and mixtures thereof.

16. A process in accordance with claim 1 wherein the monomer of step (a) is selected from the group consisting of acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate, vinyl benzoate; vinylidene chloride; pentafluoro styrene allylpentafluorobenzene, and N-vinyl pyrrole.

17. A process in accordance with claim 1 wherein the monomer is methyl methacrylate, the polymer is poly (methyl methacrylate), and the conductive component is carbon black.

18. A process in accordance with claim 1 wherein the conductive component is selected from the group consisting of conductive carbon blacks, metal oxides, metals, and mixtures thereof.

19. A process in accordance with claim 1 wherein the conductive component is selected from the group consisting of acetylene black, iron oxides, TiO and iron powder.

20. A process in accordance with claim 1 wherein the polymerization initiator is selected from the group consisting of azo compounds and peroxides.

21. A process in accordance with claim 1 wherein the polymerization initiator is benzoyl peroxide, lauroyl peroxide, 1-1-(t-butylperoxy)-3,3,5-trimethylcyclohexane, n-butyl-4,4-di-(t-butylperoxy) valerate, dicumyl peroxide, 2,2'-azodimethylvaleronitrile, 2,2'-azoiso butyronitrile, azobiscyclohexanenitrile, or 2-methylbutyronitrile, selected in an amount of from about 0.5 to about 3 weight percent, and wherein the stabilizing component is selected from a group consisting of nonionic and ionic water soluble polymeric stabilizers, selected in an amount of from about 0.1 to about 5 weight percent.

22. A process in accordance with claim 1 wherein the stabilizing component is selected from the group consisting of methyl cellulose, ethyl cellulose, hydroxypropyl cellulose, the sodium salt of carboxyl methyl cellulose, polyacrylate acids, polyvinyl alcohol, gelatins, starches, gums, alginates, zein and casein, selected in an amount of form about 0.1 to about 5 weight percent, and wherein the crosslinking component is selected from the group consisting of compounds with two or more polymerizable double bonds, selected in an amount of from about 0.01 to about 5 weight percent.

23. A process in accordance with claim 1 wherein the crosslinking component is divinylbenzene, divinyinaphthalene, ethylene glycol diacrylate, or divinylether, selected in an amount of from about 0.01 to about 5 weight percent, and wherein the chain transfer component is selected from the group consisting of mercaptans and halogenated hydrocarbons, selected in an amount of from about 0.1 to about 2 weight percent.

24. A process in accordance with claim 23 wherein the chain transfer component is carbon tetrachloride, butylmercaptan, or laurylmercaptan.

25. A process for the preparation of a conductive polymer product with an average volume particle size of from about 0.05 to about 5 microns which comprises (1) a solution polymerization of at least one monomer in the presence one or more initiators, an organic solvent, and in the presence of a electrically conductive component, and optional charge transfer agents; (2) removing the solvent from the resulting slurry of (1) by azeotropic distillation wherein the organic solvent, polymer, conductive component slurry is added or admixed with a heated aqueous phase to enable the polymer slurry to be dispersed in droplets upon addition to the aqueous phase, and wherein the solvent evaporates thereby resulting in solid beads of polymer and conductive component; (3) drying the solid beads of polymer and conductive component particles, and grinding; (4) dissolving the ground prepolymer and conductive component of (3) in an organic phase comprised of at least one monomer containing one or more initiators, and a crosslinking agent, and mixing; (5) premixing the organic phase with an aqueous phase of step (4) comprised of polyvinyl alcohol and potassium iodide, followed by circulating the mixture through an inline or continuous homogenizer; (6) transferring the suspension of (5) into a second reaction vessel or reactor, and heating to accomplish polymerization; (7) washing the slurry obtained, after cooling with a mixture of water and an aliphatic alcohol; and (8) drying the wetcake to enable the product of a polymer containing from about 1 to about 50 weight percent of a conductive component dispersed therein.

26. A process in accordance with claim 25 wherein said average volume particle size is from about 1 to about 5 microns, said one is from 1 to about 3, and said conductive component is carbon black.

27. A process for the preparation of a conductive polymer product which comprises (a) mixing monomer with electrically conductive component, solvent, polymerization initiator, and an optional chain transfer component; (b) effecting solution polymerization by heating; (c) removing said solvent by azeotropic distillation in an aqueous phase to generate a mixture of polymer and electrically conductive component; (d) drying and grinding the resulting mixture; thereafter dissolving the intermediate product in a solution comprising solvent monomer, initiator, and crosslinking component, and an optional chain transfer agent to form an organic phase; (e) mixing said organic phase with a second aqueous phase comprised of water, stabilizer, and an alkali halide to form a suspension; (f) polymerizing the resulting suspension by heating; and (g) subsequently washing and drying the polymeric product, and which product is comprised of polymer and conductive component.

28. A process in accordance with claim 1 wherein there is accomplished washing and drying of the polymeric product comprised of polymethylmethacrylate polymer and with the conductive component carbon black, and wherein said carbon black is present in an amount of from 1 to about 50 weight percent, and wherein the polymer conductive component size diameter is from about 1 to about 5 microns in volume average diameter.

* * * * *